US012810733B2

(12) United States Patent
Faizan et al.

(10) Patent No.: US 12,810,733 B2
(45) Date of Patent: Nov. 24, 2026

(54) COLLISION AVOIDANCE SYSTEM AND METHOD OF AVOIDING COLLISIONS IN A WATER BODY

(71) Applicant: Mirza Faizan, Plano, TX (US)

(72) Inventors: Mirza Faizan, Plano, TX (US); Abdullah Kabeer, Plano, TX (US); Tarik Syed, Plano, TX (US); Shayaan Shaik, Plano, TX (US); Gautam Surapaneni, Plano, TX (US); Ishaaq Mohammed Ali, Plano, TX (US); Nakshatra Piduri, Plano, TX (US); Karim Medhat Askar, Plano, TX (US); Sheza Asif, Plano, TX (US); Isha Agrawal, Plano, TX (US); Malak Askar, Plano, TX (US)

( * ) Notice: Subject to any disclaimer, the term of this patent is extended or adjusted under 35 U.S.C. 154(b) by 0 days.

(21) Appl. No.: 18/970,776

(22) Filed: Dec. 5, 2024

(65) Prior Publication Data

US 2026/0162538 A1 Jun. 11, 2026

(51) Int. Cl.

| | |
|---|---|
| ***G08G 3/02*** | (2006.01) |
| ***B63B 49/00*** | (2006.01) |
| ***B63B 79/15*** | (2020.01) |
| ***B63H 21/21*** | (2006.01) |

(52) U.S. Cl.

CPC ............... *G08G 3/02* (2013.01); *B63B 49/00* (2013.01); *B63B 79/15* (2020.01); *B63H 21/21* (2013.01); *B63B 2213/02* (2013.01)

(58) Field of Classification Search

CPC .......... G08G 3/02; B63B 49/00; B63B 79/15; B63B 2213/02; B63H 21/21

See application file for complete search history.

(56) References Cited

U.S. PATENT DOCUMENTS

| | | | | |
|---|---|---|---|---|
| 2014/0163824 | A1 * | 6/2014 | Kim et al. | B60R 21/0136 |
| 2016/0321881 | A1 * | 11/2016 | Hill | G08B 6/00 |
| 2020/0105143 | A1 * | 4/2020 | Ramstrum, Jr. | B63B 43/18 |
| 2023/0227141 | A1 * | 7/2023 | Nojiri | B63B 43/18 |
| 2024/0182144 | A1 * | 6/2024 | Yang et al. | H04N 23/698 |

FOREIGN PATENT DOCUMENTS

| | | | | |
|---|---|---|---|---|
| CN | 117350329 | * | 1/2024 | |
| JP | 2022155216 A | * | 10/2022 | B60W 30/18163 |

* cited by examiner

*Primary Examiner* — Brodie J Follman

(57) ABSTRACT

A collision avoidance system for avoiding collisions in a water body is provided. The system comprises an aerial platform configured to be positioned over the water body, a sensor suite attached to the aerial platform comprising at least one radar sensor and a GPS module, a control unit configured to predict potential collision points based on the trajectory of the detected watercrafts and generate collision alert signals and course adjustment instructions in response to predicted potential collisions. The system comprises at least one wearable device configured to be worn by a user, configured to receive the collision alert signals and course adjustment instructions and provide alerts to the user indicating the potential collision and display course adjustment instructions.

20 Claims, 4 Drawing Sheets

COLLISION AVOIDANCE SYSTEM AND METHOD OF AVOIDING COLLISIONS IN A WATER BODY

TECHNICAL FIELD

This disclosure relates generally to collision avoidance systems, and more particularly to a collision avoidance system for avoiding collisions in a water body. Furthermore, the disclosure relates to a method of avoiding collisions in a water body.

BACKGROUND

Water-based recreational activities, such as boating, kayaking, and jet skiing, are highly popular, particularly in lakes, rivers, and coastal regions. However, these activities are not without risks. One of the most significant dangers facing recreational watercraft operators is the potential for collisions with other watercrafts in the water body. Such collisions can result in serious injuries, damage to vessels, and in some cases, loss of life. The increasing density of water traffic, coupled with limited visibility and unpredictable water conditions, makes it challenging for operators to avoid collisions, especially in high-traffic areas. Furthermore, the presence of swimmers and other objects in the water body make it even more difficult to maintain safety in the water body.

Traditional systems for watercraft navigation and collision avoidance, such as GPS-based tracking systems and Automatic Identification Systems, are primarily used for large vessels, like cargo ships, and are typically limited to providing position data. While these systems are effective for monitoring the general location of vessels, they do not offer real-time predictions of collision courses or provide actionable alerts that enable operators of smaller, recreational watercraft to take evasive actions. Additionally, these conventional systems are not designed to account for the presence of swimmers or medium-sized debris, further increasing the risk of accidents.

There is also no widely adopted system that actively monitors the movement of all watercraft and potential hazards from an overhead perspective, allowing for comprehensive tracking across a body of water. Moreover, smaller watercraft operators generally lack the advanced navigational tools found on larger vessels, leaving them reliant on visual cues or basic navigational aids, which can be insufficient in preventing collisions in many cases.

Therefore, there is a need for a mechanism or system that can accurately monitor and track the objects in the water body to prevent any potential collisions.

SUMMARY OF INVENTION

According to first aspect, a collision avoidance system for avoiding collisions in a water body is disclosed. The system includes an aerial platform, a sensor suite, a control unit and at least one wearable device. The aerial platform configured to be positioned over the water body. The sensor suite is attached to the aerial platform. The sensor suite comprises at least one radar sensor and a GPS module. The at least one radar sensor is configured to detect position, size, velocity, and trajectory of watercrafts in or on the water body. The GPS module augments the position detected by the radar sensor. The control unit is communicably coupled with the sensor suite. The control unit is configured to predict potential collision points based on the trajectory of the detected watercrafts, and generate collision alert signals and course adjustment instructions in response to predicted potential collisions. The at least one wearable device is configured to be worn by a user, wherein the wearable device is in communication with the control unit. The at least one wearable device is configured to receive the collision alert signals and course adjustment instructions, and provide alerts to the user indicating the potential collision and display course adjustment instructions.

In an embodiment, the system comprises a propulsion system operably connected to the aerial platform, configured to control position and direction of movement of the aerial platform over the water body.

In an embodiment, the aerial platform comprises a power supply for powering the sensor suite and the propulsion system.

In an embodiment, the system comprises a communication module configured to communicably couple the at least one wearable device with the control unit.

In an embodiment, the control unit is further configured to calculate a velocity vector for each detected watercraft and determine collision points based on the velocity vector and position data.

In an embodiment, the sensor suite is further configured to detect swimmers and debris in the water body.

In an embodiment, the control unit is further configured to send the collision alert signals and the course adjustment instructions to the swimmers on the wearable device.

In an embodiment, the control unit is further configured to modify the potential collision points and the course adjustment instructions based on the presence of the swimmers and the debris in the water body.

In an embodiment, the sensor suite further comprises environmental sensors for detecting wind speed, water currents, and weather conditions.

In an embodiment, the control unit is further configured to modify the potential collision points and the course adjustment instructions based on the detected wind speed, water currents, and weather conditions.

In an embodiment, the system further comprises a secondary alert system on the watercrafts communicably coupled to the control unit and configured to receive collision alert signals from the control unit and activate physical indicators on the watercraft.

In an embodiment, the system further comprises airbags installed on the watercrafts and operationally coupled to the secondary alert system, wherein the control unit is configured to instruct the secondary alert system to deploy airbags in case of imminent collision.

In an embodiment, the system comprises a base station communicably coupled to the control unit and the wearable device, wherein the base station is configured to store and process data related to the trajectory of objects and maintain a historical log of potential collisions and corrective actions taken.

According to second aspect, a method of avoiding collisions in a water body is disclosed. The method includes steps of: deploying an aerial platform over the water body; detecting position, size, velocity, and trajectory of watercrafts in or on the water body, via a sensor suite; predicting potential collision points between the watercrafts based on the detected trajectory, via a control unit; and generating and transmitting collision alert signals and course adjustment instructions to at least one wearable device worn by a user.

In an embodiment, the method further includes controlling the position and direction of the aerial platform using a propulsion system.

In an embodiment, the method further includes calculating a velocity vector for each detected watercraft and determine collision points based on the velocity vector and position data.

In an embodiment, the method further includes detecting swimmers and debris in the water body, and sending the collision alert signals and the course adjustment instructions to the swimmers on the wearable device.

In an embodiment, the method further includes modifying the potential collision points and course adjustment instructions based on the presence of the swimmers and the debris in the water body.

In an embodiment, the method further includes modifying the predicted trajectories of watercrafts based on environmental factors, including wind speed, water currents, and weather conditions.

In an embodiment, the method further includes deploying airbags in the event of an imminent collision based on signals received from the control unit.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
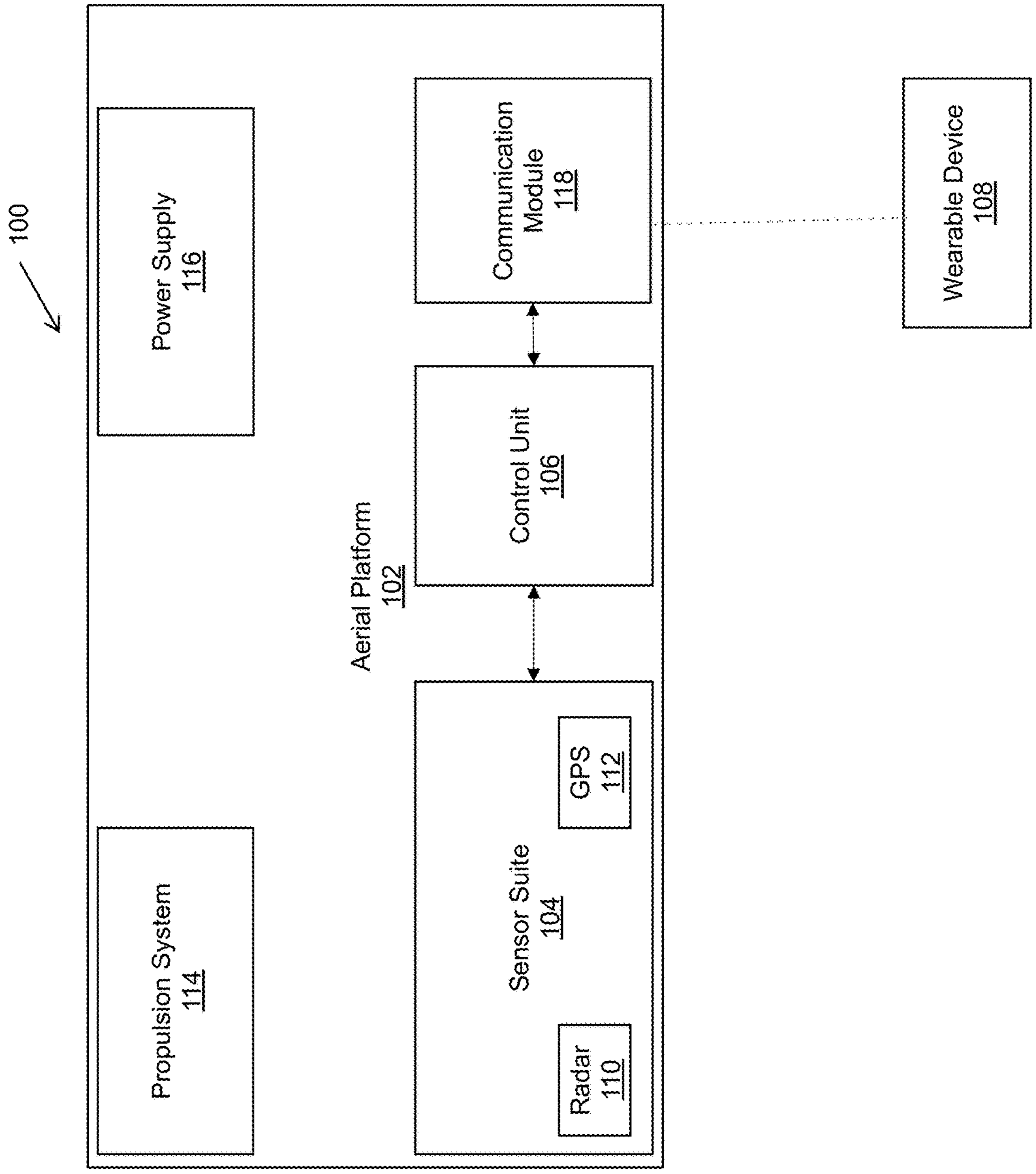
FIG. 1 illustrates a block diagram of a collision avoidance system for avoiding collisions in a water body, in accordance with first aspect of the present disclosure.

Referring to FIG. 1, which illustrates a block diagram of a collision avoidance system 100 for avoiding collisions in a water body is disclosed. The system 100 comprises an aerial platform 102, a sensor suite 104, a control unit 106 and at least one wearable device 108. The aerial platform 102 is configured to be positioned over the water body. The sensor suite 104 is attached to the aerial platform 102. The sensor suite 104 comprises at least one radar sensor 110 and a GPS module 112. The at least one radar sensor 110 is configured to detect position, size, velocity, and trajectory of watercrafts in or on the water body. The GPS module 112 augments the position detected by the radar sensor 110. The control unit 106 is communicably coupled with the sensor suite 104. The control unit 106 is configured to predict potential collision points based on the trajectory of the detected watercrafts, and generate collision alert signals and course adjustment instructions in response to predicted potential collisions. The at least one wearable device 108 is configured to be worn by a user, wherein the wearable device 108 is in communication with the control unit 106. The at least one wearable device 108 is configured to receive the collision alert signals and course adjustment instructions, and provide alerts to the user indicating the potential collision and display course adjustment instructions.

Figure 2:
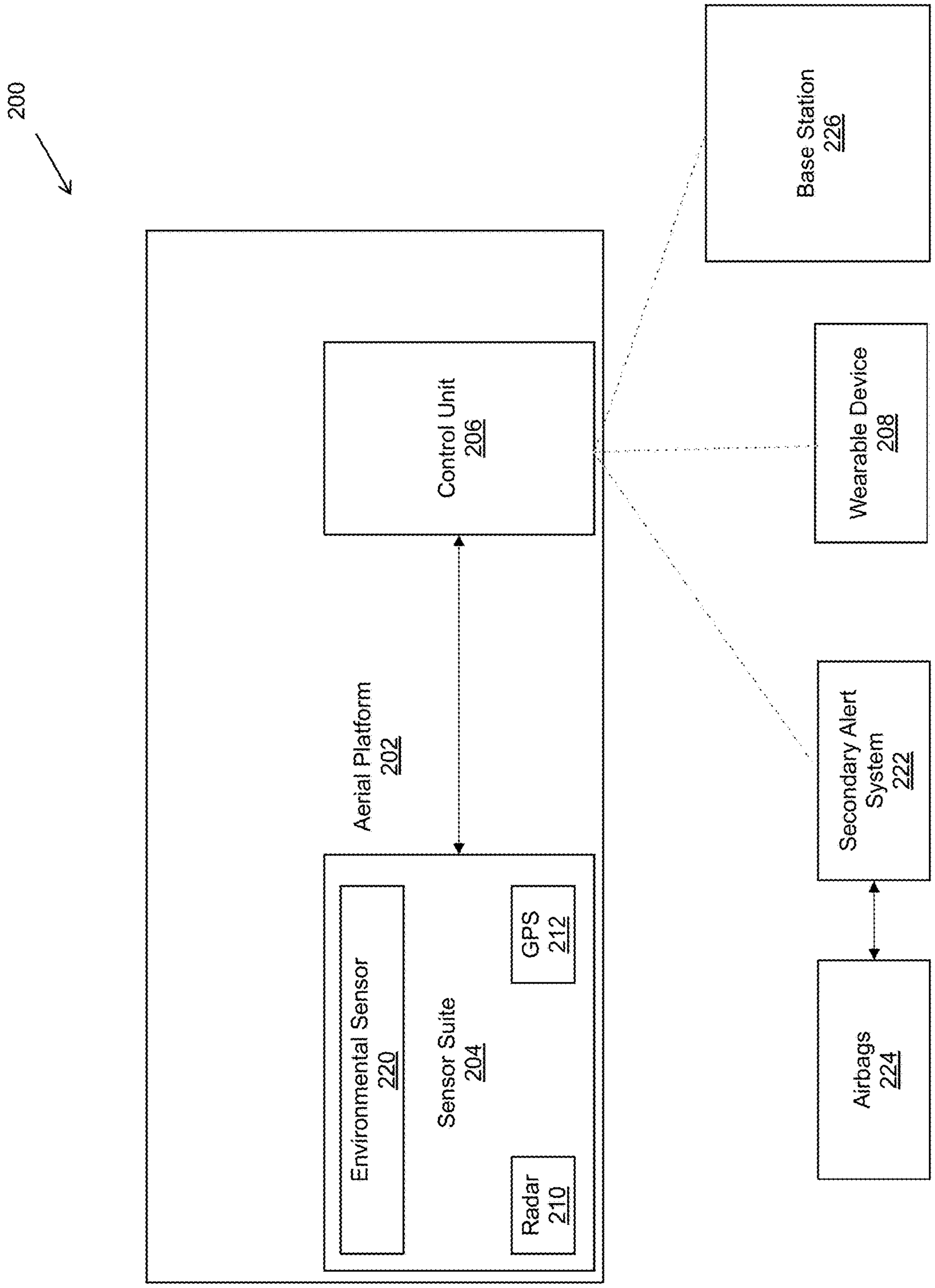
FIG. 2 illustrates a block diagram of a collision avoidance system for avoiding collisions in a water body, in accordance with an embodiment of the present disclosure.

Referring now to FIGS. 1 and 2, the system 100 is advantageous in terms of providing comprehensive collision avoidance. The system 100 beneficially utilizes a combination of radar and GPS sensors to detect the position, velocity, and trajectory of watercraft, swimmers, and debris, allowing it to predict potential collisions in real-time. This proactive approach gives watercraft operators sufficient time to take corrective action and avoid dangerous situations. The system 100 is particularly beneficial for swimmer safety as the system 100 is capable of precisely determining the position of the swimmers in the water body and account for swimmers as well in the collision avoidance.

In an embodiment, the aerial platform 102 comprises at least one of: a lighter-than-air balloon, a drone, a hovercraft and so on. The aerial platform 102 is designed to hover over the body of water, providing an elevated vantage point for monitoring and detecting potential collision hazards. The aerial platform 102 may be capable of integrating additional components and payload for the functioning of the system.

In an embodiment, the system 100 comprises a propulsion system 114 operably connected to the aerial platform 102, configured to control position and direction of movement of the aerial platform 102 over the water body. The propulsion system 114 may be mounted on the aerial platform 102 such a way as to allow the aerial platform 102 to be propelled, steered and maintained in a desired location, at a desired height over the body of water. The propulsion system 114 may comprise one or more propellers, fans, or any other suitable thrust mechanism. The propulsion system 114 may further comprise a steering system to enable fine adjustments in position of the aerial platform 102. The propulsion system 114 may be controlled by the control unit 106. Alternatively, the propulsion system 114 may be controlled by a ground based controller. It is to be understood that the propulsion system 114 enables the aerial platform 102 to change position, adjust altitude, or hover over specific areas where higher traffic or potential hazards are present.

In an embodiment, the aerial platform 102 comprises a power supply 116 for powering the sensor suite 104 and the propulsion system 114. The power supply 116 may comprise a solar panel array to capture sunlight and generate power. The power supply 116 further comprise backup power sources such as rechargeable batteries. It is to be understood that the power supply 116 may also include the necessary electronic components required for power conversion.

In an embodiment, the system 100 comprises a communication module 118 configured to communicably couple the at least one wearable device 108 with the control unit 106. The communication module 118 may utilize wireless communication protocols such as Wi-Fi, cellular, or satellite communication to ensure real-time data transmission between the control unit 106 and the at least one wearable device 108. Beneficially, the communication module 118 ensures that alerts generated by the control unit 106 are instantly relayed to the wearable devices 108 of watercraft operators, enabling immediate action.

It is to be understood that the GPS module 112 augments the position detected by the radar sensor 110. The GPS module 112 determines the position using the global positioning system with high accuracy. The position detected by the radar sensor 110 is augmented and improved using the position detected by the GPS module 112.

In an embodiment, the control unit 106 is further configured to calculate a velocity vector for each detected watercraft and determine collision points based on the velocity vector and position data. It is to be understood that the radar sensor 110 and the GPS module 112 on the aerial platform 102 continuously track the position of each watercraft on the water's surface. These positions may be logged as coordinate points in a two-dimensional plane (latitude and longitude). For each watercraft, the control unit 106 may calculate the displacement, which is the change in position between two consecutive time-stamped readings. The position data may be updated at regular intervals (e.g., every second), providing a series of time-stamped position readings for each watercraft. The control unit 106 may determine the displacement by calculating the distance between the initial position and the subsequent position. The control unit 106 may further determine the time interval between two consecutive position readings. Furthermore, the control unit 106 may determine the speed of the watercraft by dividing the displacement with the time interval. Furthermore, the control unit 106 may be configured to determine the direction of the watercraft by analyzing the change in position along the x and y axes (latitude and longitude). Such direction may be represented as an angle relative to a fixed axis. The control unit 106 is configured to calculate the velocity vector as a combination of speed and direction of movement of the watercraft.

It is to be understood that the control unit 106 may predict the potential collision points by analyzing future positions of the watercraft and their trajectories. The future position of the watercraft may be determined based on the current velocity vector of the respective watercraft. It is to be understood that once the future positions of all the watercrafts is detected, the control unit 106 is configured to determine potential collision points when two or more watercrafts are projected to occupy same or near same position at a specific time in future. Furthermore, the control unit 106 may determine a time to collision by determining how long it will take for the watercraft to reach the predicted collision point based on their respective velocities.

In an embodiment, the sensor suite 104 is further configured to detect swimmers and debris in the water body. Beneficially, the sensor suite 104 may be specifically calibrated to detect presence of swimmers by analyzing patterns of reflections of the radar signals. The sensor suite 104 may further utilize techniques such as sensor fusion and information triangulation to detect the position of the swimmers and the debris in the water body.

In an embodiment, the control unit 106 is further configured to send the collision alert signals and the course adjustment instructions to the swimmers on the wearable device 108. It is to be understood that the swimmers may also be wearing the wearable device 108. The control unit 106 sends the collision alert signals and the course adjustment instructions to the swimmers to enhance the swimmer safety in the water body.

In an embodiment, the control unit 106 is further configured to modify the potential collision points and the course adjustment instructions based on the presence of the swimmers and the debris in the water body. It is to be understood that the potential collision points and the course adjustment instructions for the watercrafts may be modified by the control unit 106 based on the presence of the swimmers and the debris in the water body. In an example, if a particular watercraft is moving on a trajectory that it will occupy the same future position as the swimmer at a certain time in future, the potential collision points and the course adjustment instructions for the watercraft is modified by the control unit 106 to avoid the accident between the swimmer and the watercraft.

FIG. 2 illustrates a block diagram of the collision avoidance system 200 (100 in FIG. 1) for avoiding collisions in a water body, in accordance with an embodiment of the disclosure. The system 200 comprises an aerial platform 202, a sensor suite 204, a control unit 206 and at least one wearable device 208. The aerial platform 202 is configured to be positioned over the water body. The sensor suite 204 is attached to the aerial platform 202. The sensor suite 204 comprises at least one radar sensor 210 and a GPS module 212. The at least one radar sensor 210 is configured to detect position, size, velocity, and trajectory of watercrafts in or on the water body. The GPS module 212 augments the position detected by the radar sensor 210. The control unit 206 is communicably coupled with the sensor suite 204. The control unit 206 is configured to predict potential collision points based on the trajectory of the detected watercrafts, and generate collision alert signals and course adjustment instructions in response to predicted potential collisions. The at least one wearable device 208 is configured to be worn by a user, wherein the wearable device 208 is in communication with the control unit 206. The at least one wearable device 208 is configured to receive the collision alert signals and course adjustment instructions, and provide alerts to the user indicating the potential collision and display course adjustment instructions.

In an embodiment, the sensor suite 204 further comprises environmental sensors 220 for detecting wind speed, water currents, and weather conditions. The environmental sensors 220 may comprise wind speed sensor, water current sensor, weather sensor and so on.

In an embodiment, the control unit 206 is further configured to modify the potential collision points and the course adjustment instructions based on the detected wind speed, water currents, and weather conditions. Beneficially, the modification of the potential collision points and the course adjustment instructions based on the detected wind speed, water currents, and weather conditions enhances the accuracy of the system 200.

In an embodiment, the system 200 further comprises a secondary alert system 222 on the watercrafts communicably coupled to the control unit 206 and configured to receive collision alert signals from the control unit 206 and activate physical indicators on the watercraft. It is to be understood that the physical indicators may comprise a siren, a warning light and so on. The activation of the physical indicators may beneficially alert the nearby swimmers and the watercrafts.

In an embodiment, the system 200 further comprises airbags 224 installed on the watercrafts and operationally coupled to the secondary alert system 222, wherein the control unit 206 is configured to instruct the secondary alert system 222 to deploy airbags 224 in case of imminent collision. Beneficially, such deployment of the airbags may prevent physical damage to the watercrafts and may prevent the swimmers from getting seriously injured in an event of collision.

In an embodiment, the system 200 comprises a base station 226 communicably coupled to the control unit 206 and the wearable device 208, wherein the base station 226 is configured to store and process data related to the trajectory of objects and maintain a historical log of potential collisions and corrective actions taken. Beneficially, the base station 226 may send the historical log of potential collisions and corrective actions taken to the control unit 206 for adaptive learning and continuous improvement of the system 200.

The control unit 106, 206 may include suitable logic, circuitry, and interfaces that may be configured to execute program instructions associated with a set of operations to be executed. The control unit 106, 206 may include one or more processing units, which may be implemented as an integrated processor or a cluster of processors that perform the functions of the one or more processing units, collectively. The control unit 106, 206 may be implemented based on a number of processor technologies known in the art. Example implementations of the control unit 106, 206 may include, but are not limited to, an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The wearable device 108, 208 may include user interface to present information to the user. Furthermore, the wearable device 108, 208 may include communication unit to communicate with external entities such a control unit 106, 206. In an example, the wearable device 108, 208 may be a smart watch. In another example, the wearable device 108, 208 may be a fitness tracker. In yet another example, the wearable device 108, 208 may be a custom device meant for the specific purpose of navigation and collision alert. The wearable device is worn by the user. The user may be a swimmer or an operator of the watercraft.

Figure 3:
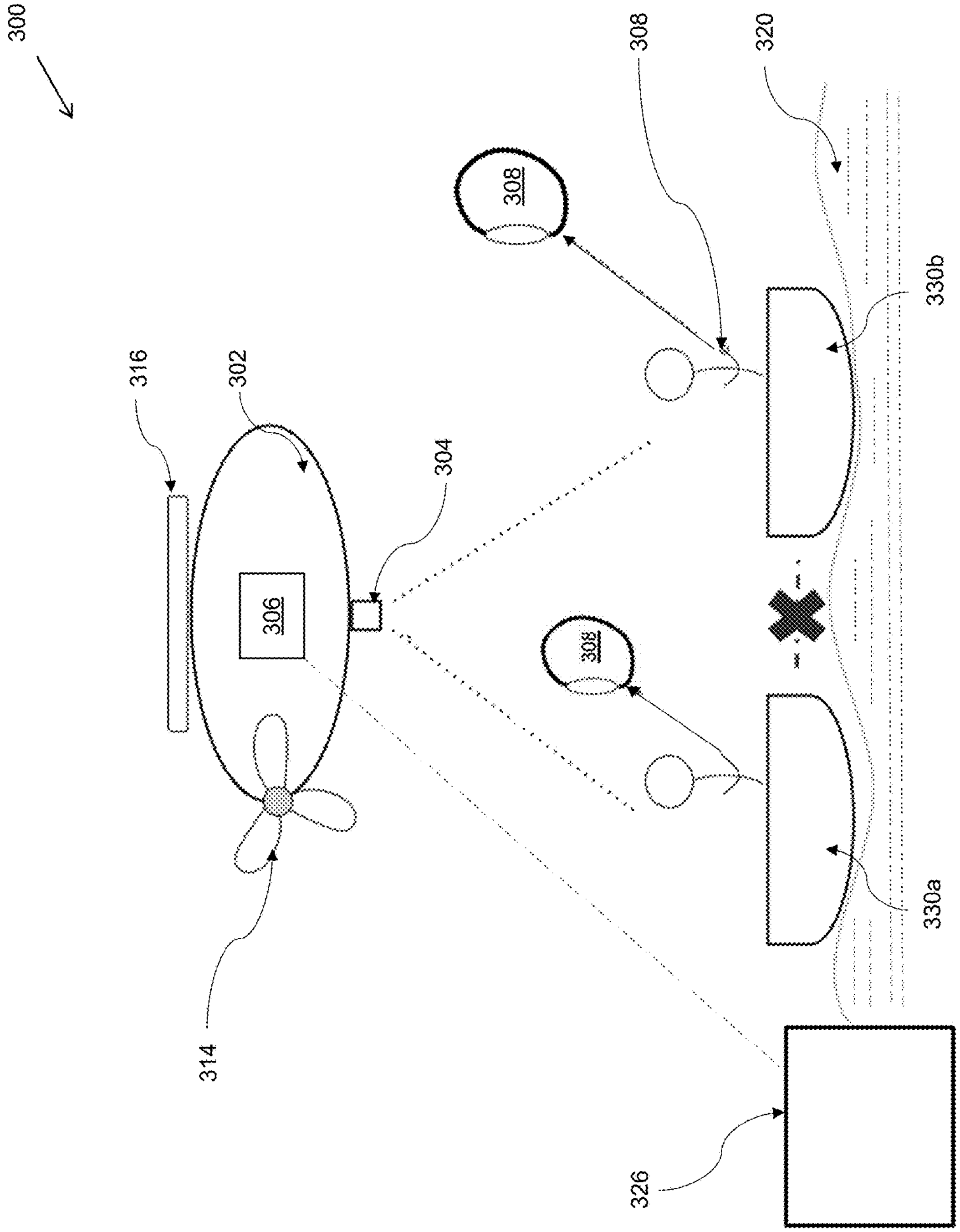
FIG. 3 illustrates a water body environment with collision avoidance system deployed, in accordance with an example of the present disclosure.

FIG. 3 is a water environment 300 with collision avoidance system (as shown in FIG. 1 & FIG. 2) deployed in the water environment 300, in accordance with an example of the disclosure. The water environment 300 comprises water body 320. The environment 300 comprises watercrafts 330*a*, 330*b* on the surface of the water body 320. The watercrafts 330*a*, 330*b* may be operated by their respective operators. The operators of the watercrafts 330*a*, 330*b* may be wearing their respective wearable devices 308. The environment 300 comprises an aerial platform 302 deployed at a certain height in the air from the water body 320. The aerial platform 302 comprises a sensor suite 304 configured to detect position, size, velocity, and trajectory of watercrafts 330*a*, 330*b* in or on the water body 320. The aerial platform 302 comprises a control unit 306, communicably coupled to the sensor suite 304. The control unit 306 is configured to predict potential collision points based on the trajectory of the detected watercrafts 330*a*, 330*b*, and generate collision alert signals and course adjustment instructions in response to predicted potential collisions. Furthermore, the control unit 306 is configured to send the collision alert signals and the course adjustment instructions to the wearable device 308 of the of the operators of the watercrafts 330*a*, 330*b*. The aerial platform 302 comprises a propulsion system 314 configured to control position and direction of movement of the aerial platform 302 over the water body 320. The propulsion system 314 may enable the aerial platform 302 to hover over the water body 320. Furthermore, the aerial platform 302 comprises a power supply 316. The power supply 316 may powerup the propulsion system 314, the control unit 306 and the sensor suite 304. The environment 300 further comprises a base station 326 communicably coupled with the control unit 306. In such example, the sensor suite 304 may continuously monitor the position, size, velocity, and trajectory of watercrafts 330*a*, 330*b* on the water body 320 and the control unit 306 may continuously log the tracked positions of the watercrafts 330*a*, 330*b* as coordinate points in a two-dimensional plane (latitude and longitude). The control unit 306 may calculate the displacement of the water crafts 330*a* and 330*b*. The position data of the watercrafts 330*a* and 330*b* may be updated at regular intervals (e.g., every second), providing a series of time-stamped position readings for each of the watercrafts 330*a*, 330*b*. Furthermore, the control unit 306 may predict the potential collision points by analyzing future positions of the watercrafts 330*a*, 330*b* and their trajectories. In a scenario, when the future positions of the watercraft 330*a* and the future positions of the watercraft 330*b* are projected to occupy same or near same position at a specific time in future, such position is detected as the potential collision point. In such situation, the control unit 306 would generate the collision alert signals and the course adjustment instructions to send the same to the wearable device 308 of the operators of the watercrafts 330*a* and 330*b*. The course adjustment instructions may be executed by the operators changing course of the watercrafts 330*a* and 330*b* to avoid collision. Furthermore, the base station 326 would create a log of the historical data of the collision alert signals, the course adjustment instructions, and actions taken by the operators of the watercrafts 330*a*, 330*b*.

Figure 4:
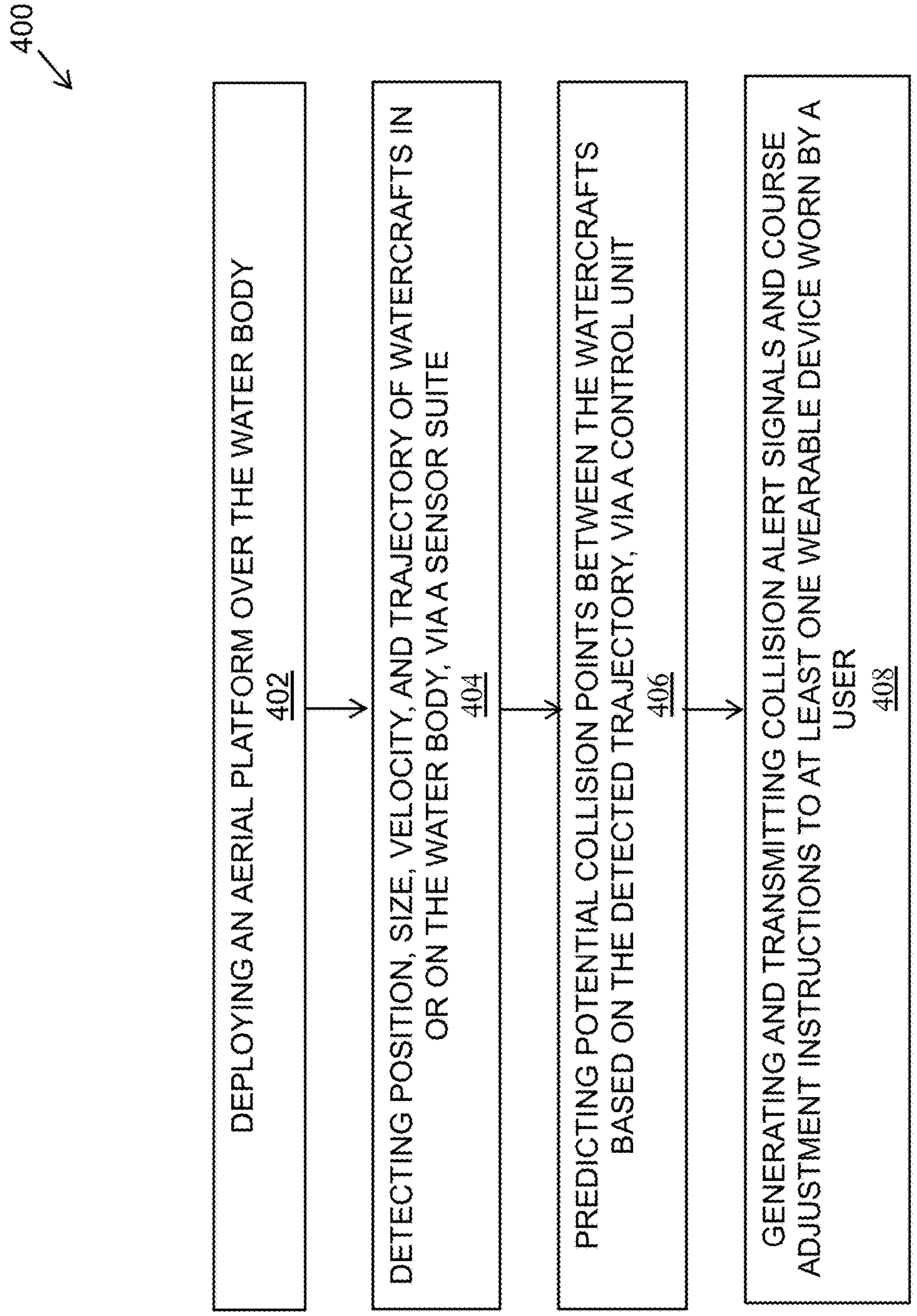
FIG. 4 illustrates a flow chart of a method of avoiding collisions in a water body, in accordance with second aspect of the present disclosure.

FIG. 4 is a flowchart that illustrates an example of a method of avoiding collisions in a water body, in accordance with an embodiment of the disclosure. FIG. 4 is explained in conjunction with elements from FIGS. 1-3. With reference to FIG. 4, there is shown a flowchart 400. The operations from 402 to 408 may be implemented by any computing system. The operations may start at 402 and may proceed to 408.

At 402, the method comprises deploying an aerial platform over the water body.

At 404, the method comprises detecting position, size, velocity, and trajectory of watercrafts in or on the water body, via a sensor suite.

At 406, the method comprises predicting potential collision points between the watercrafts based on the detected trajectory, via a control unit.

At 408, the method comprises generating and transmitting collision alert signals and course adjustment instructions to at least one wearable device worn by a user.

In an embodiment, the method 400 comprises controlling the position and direction of the aerial platform using a propulsion system.

In an embodiment, the method 400 comprises calculating a velocity vector for each detected watercraft and determine collision points based on the velocity vector and position data.

In an embodiment, the method 400 comprises detecting swimmers and debris in the water body, and sending the collision alert signals and the course adjustment instructions to the swimmers on the wearable device.

In an embodiment, the method 400 comprises modifying the potential collision points and course adjustment instructions based on the presence of the swimmers and the debris in the water body.

In an embodiment, the method 400 comprises modifying the predicted trajectories of watercrafts based on environmental factors, including wind speed, water currents, and weather conditions.

In an embodiment, the method 400 comprises deploying airbags in the event of an imminent collision based on signals received from the control unit.

Although the flowchart 400 is illustrated as discrete operations, such as 402, 404, 406 and 408 the disclosure is not so limited. Accordingly, in certain embodiments, such discrete operations may be further divided into additional operations, combined into fewer operations, or eliminated, depending on the implementation without detracting from the essence of the disclosed embodiments.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A collision avoidance system for avoiding collisions in a water body, wherein the system comprises:
- an aerial platform configured to be positioned over the water body;
- a sensor suite attached to the aerial platform, the sensor suite comprising:
  - at least one radar sensor configured to detect position, size, velocity, and trajectory of watercrafts in or on the water body, and
  - a GPS module to augment the position detected by the radar sensor;
- a control unit communicably coupled with the sensor suite, wherein the control unit is configured to:
  - predict potential collision points based on the trajectory of the detected watercrafts, and
  - generate collision alert signals and course adjustment instructions in response to predicted potential collisions; and
- at least one wearable device configured to be worn by a user, wherein the wearable device is in communication with the control unit, and configured to:
  - receive the collision alert signals and course adjustment instructions; and
  - provide alerts to the user indicating the potential collision and display course adjustment instructions.

2. The system of claim 1, wherein the system comprises a propulsion system operably connected to the aerial platform, configured to control position and direction of movement of the aerial platform over the water body.

3. The system of claim 1, wherein the aerial platform comprises a power supply for powering the sensor suite and the propulsion system.

4. The system of claim 1, wherein the system comprises a communication module configured to communicably couple the at least one wearable device with the control unit.

5. The system of claim 1, wherein the control unit is further configured to calculate a velocity vector for each detected watercraft and determine collision points based on the velocity vector and position data.

6. The system of claim 1, wherein the sensor suite is further configured to detect swimmers and debris in the water body.

7. The system of claim 6, wherein the control unit is further configured to send the collision alert signals and the course adjustment instructions to the swimmers on the wearable device.

8. The system of claim 6, wherein the control unit is further configured to modify the potential collision points and the course adjustment instructions based on the presence of the swimmers and the debris in the water body.

9. The system of claim 1, wherein the sensor suite further comprises environmental sensors for detecting wind speed, water currents, and weather conditions.

10. The system of claim 9, wherein the control unit is further configured to modify the potential collision points and the course adjustment instructions based on the detected wind speed, water currents, and weather conditions.

11. The system of claim 1, wherein the system further comprises a secondary alert system on the watercrafts communicably coupled to the control unit and configured to receive collision alert signals from the control unit and activate physical indicators on the watercraft.

12. The system of claim 11, wherein the system further comprises airbags installed on the watercrafts and operationally coupled to the secondary alert system, wherein the control unit is configured to instruct the secondary alert system to deploy airbags in case of imminent collision.

13. The system of claim 1, wherein the system comprises a base station communicably coupled to the control unit and the wearable device, wherein the base station is configured to store and process data related to the trajectory of objects and maintain a historical log of potential collisions and corrective actions taken.

14. A method of avoiding collisions in a water body, comprising:

deploying an aerial platform over the water body;

detecting, via at least one radar sensor of a sensor suite attached to the aerial platform, position, size, velocity, and trajectory of watercrafts in or on the water body;

augmenting the detected position of each watercraft using a GPS module of the sensor suite;

predicting, via a control unit communicably coupled with the sensor suite, potential collision points between the watercrafts based on the detected trajectory;

generating collision alert signals and course adjustment instructions in response to the predicted potential collision points;

transmitting the collision alert signals and course adjustment instructions from the control unit to at least one wearable device worn by a user;

providing, via the at least one wearable device, alerts to the user indicating the potential collision; and displaying, via the at least one wearable device, the course adjustment instructions.

15. The method of claim 14, further comprising controlling the position and direction of the aerial platform using a propulsion system.

16. The method of claim 14, further comprising calculating a velocity vector for each detected watercraft and determine collision points based on the velocity vector and position data.

17. The method of claim 14, further comprising detecting swimmers and debris in the water body, and sending the collision alert signals and the course adjustment instructions to the swimmers on the wearable device.

18. The method of claim 17, further comprising modifying the potential collision points and course adjustment instructions based on the presence of the swimmers and the debris in the water body.

19. The method of claim 14, further comprising modifying the predicted trajectories of watercrafts based on environmental factors, including wind speed, water currents, and weather conditions.

20. The method of claim 14, further comprising deploying airbags in the event of an imminent collision based on signals received from the control unit.

* * * * *